United States Patent [19]

Grosso et al.

[11] Patent Number: 4,676,456
[45] Date of Patent: Jun. 30, 1987

[54] STRAP DOWN ROLL REFERENCE

[75] Inventors: Vincent A. Grosso, Hopkinton; Robert J. Fitzgerald, Wayland; Richard J. DeFonzo, Northboro, all of Mass.

[73] Assignee: Raytheon Company, Lexington, Mass.

[21] Appl. No.: 802,496

[22] Filed: Nov. 27, 1985

[51] Int. Cl.$^4$ ............................ F41G 7/00; F41G 7/34
[52] U.S. Cl. .................................... 244/3.21; 244/3.23
[58] Field of Search ..................... 244/3.21, 170, 3.22, 244/3.23, 3.15

[56] References Cited
U.S. PATENT DOCUMENTS

| | | | |
|---|---|---|---|
| 4,370,716 | 1/1983 | Amieux | 244/3.22 |
| 4,504,032 | 3/1985 | Phillips et al. | 244/170 |
| 4,542,870 | 9/1985 | Howell | 244/3.15 |

Primary Examiner—Stephen C. Bentley
Assistant Examiner—Stephen Johnson
Attorney, Agent, or Firm—Philip J. McFarland

[57] ABSTRACT

Apparatus and method of determining a roll reference for strap down seeker in a spinning projectile is shown to consist of the steps of: (a) determining the frequency spectrum of signals out of an accelerometer disposed in such missile to be sensitive to roll, precession and nutation forces; (b) separating the signals caused to the roll forces; and (c) processing the separated signals to determine the roll reference.

3 Claims, 10 Drawing Figures

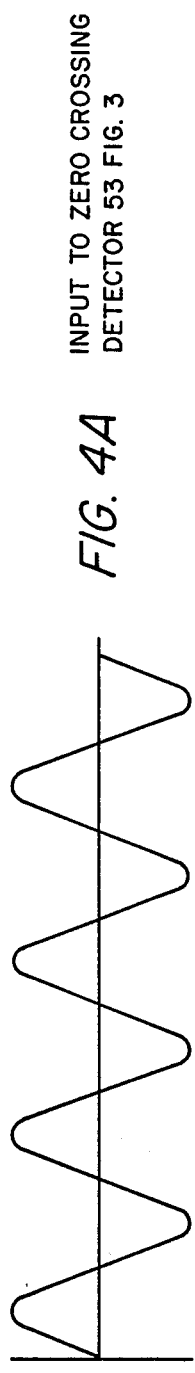
FIG. 4A  INPUT TO ZERO CROSSING DETECTOR 53 FIG. 3
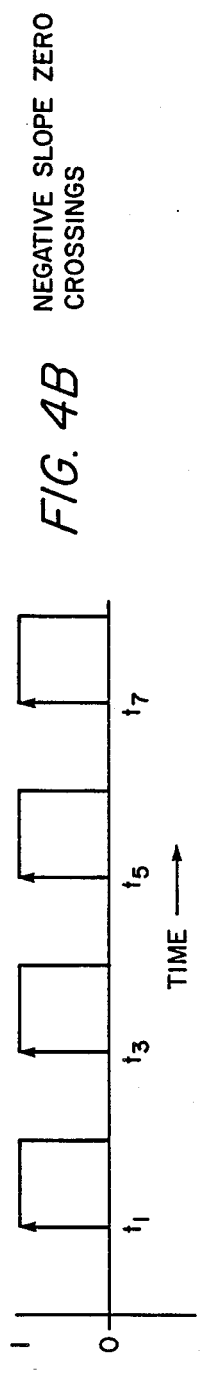
FIG. 4B  NEGATIVE SLOPE ZERO CROSSINGS
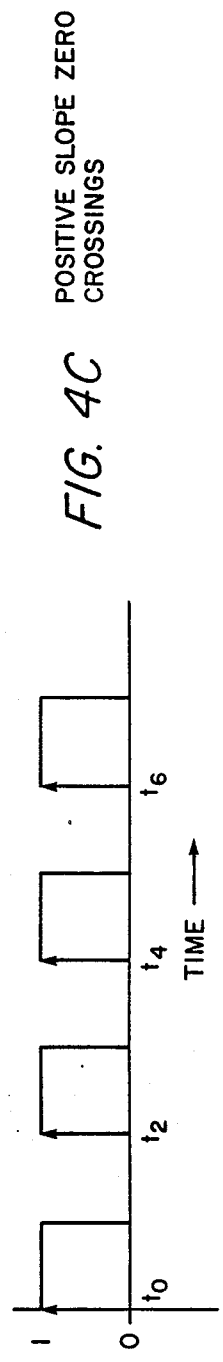
FIG. 4C  POSITIVE SLOPE ZERO CROSSINGS

STRAP DOWN ROLL REFERENCE

BACKGROUND OF THE INVENTION

This invention pertains generally to inertial reference systems and particularly to an inertial roll attitude reference system for a spinning projectile.

A guidance system for a spinning projectile is described in U.S. Pat. No. 4,347,996 issued Sept. 7, 1982 to V. A. Grosso and assigned to the same assignee as this application. In that system, advantage is taken of the spin-induced angular momentum vector in a spinning projectile to measure the angle between the line-of-sight between such projectile and a selected target and the velocity vector of such projectile (and the first derivative of such angle). In accordance with the teaching of the just-cited patent, a body-fixed seeker is used to derive control signals for guiding the projectile toward a selected target. In operation it is necessary that a "roll reference" be provided to determine the relationship between the plane (referred to as the "engagement plane") determined by the velocity vector of the spinning projectile and the line-of-sight from such projectile to a selected target. That is to say, an "inertial roll reference" is required. In the system being discussed an inertial roll reference is provided by detecting the maxima and minima of signals from a ground based source of linearly polarized radiations illuminating a linearly polarized antenna affixed to the spinning projectile. Obviously such an arrangement is feasible only in tactical situations wherein the linearly polarized antenna may be continuously illuminated during flight. In other tactical situations, for example when the target is beyond the horizon, it is evident that the requisite roll reference cannot be derived by illuminating an antenna so other means of deriving such reference must be provided. According to the known art, appropriate inertial instrumentation is the only way to derive a roll reference. However, as noted in the patent being discussed, the inertial instrumentation would have to include a gyroscope, meaning that the advantages of spin stabilization would be lost.

SUMMARY OF THE INVENTION

With the foregoing background of the invention in mind, it is therefore a primary object of this invention to provide a self-contained roll reference system for a spin-stabilized guided projectile.

The primary object and other objects of this invention are generally attained by providing a small solid state accelerometer within the projectile, such accelerometer being displaced radially from the centerline and forward of the center of gravity, with the sensitive axis of the accelerometer being aligned parallel to the longitudinal axis of the projectile. The output signal from the accelerometer is an amplitude and frequency modulated (AM and FM) signal proportional to the spin frequency, the spin frequency minus the precession frequency, and the spin frequency minus the nutation frequency. Signal processing electronics are provided to resolve each of the foregoing frequencies for subsequent processing in a digital signal processor that derives the requisite projectile guidance commands.

BRIEF DESCRIPTION OF THE DRAWINGS

The foregoing features of this invention, as well as the invention itself, may be more fully understood from the following detailed description read together with the accompanying drawings, wherein:

FIGS. 4A to 4C are waveforms useful in understanding the operation of the zero-crossing detectors of FIG. 3;

DESCRIPTION OF THE PREFERRED EMBODIMENT

Before undertaking the detailed description of the contemplated inertial roll reference system, a brief review of the technical requirements of any spin-stabilized projectile guidance system will be made. Thus, any spin-stabilized guidance system takes advantage of the gyroscopic nature of a spinning projectile to allow a body-fixed seeker to measure the angular boresight of a target relative to an inertial reference in pitch and yaw. The boresight measurement and a corresponding roll position angle determine the spherical coordinates of a target in a body-fixed nonspinning reference frame. All signal processing is performed on the body-fixed nonspinning reference frame. The projectile spin rate must be known in order to establish the body-fixed, nonspinning reference frame, and the dynamics of the spin-stabilized projectile are involved in the spin rate measurement. These dynamics are complex and comprise three modes.

The first dynamic mode, often called "the coning mode," occurs at the spin frequency and is caused by aerodynamic and inertial asymmetries. This mode causes the projectile to rotate about the velocity vector at a fixed coning angle, or angle of attack, at a rate equal to the spin frequency. The other two dynamic modes, nutation and precession, are similarly caused by aerodynamic forces and moments, as well as by the inertial properties of the projectile. The effect of these modes is to vary the angle of attack at each one of two separate frequencies lower than the spin frequency. Thus, as the centerline of the projectile rotates about the velocity vector, the resulting angle of attack is modulated by the amplitudes and frequencies of the three separate modes. Consequently, the measured seeker boresight data contains the lead angle component (the angle between the velocity vector of the projectile and the line-of-sight (LOS) vector to the target) modulated by coning, nutation and precession.

The outputs of the body-fixed seeker and the inertial roll reference system are processed to estimate the LOS rate. When the LOS rate exceeds an acceptable threshold, selected pairs of a plurality of thrusters in helical channels about the periphery of the projectile are fired to achieve guidance corrections, as explained in detail in U.S. Pat. No. 4,347,996. Excitation of the nutation mode amplitude is minimized by firing the second of each pair of thrusters with a delay of one-half a nutation period.

Precession mode amplitude is controlled by disposing the thrusters along an appropriate helix angle.

Figure 1:
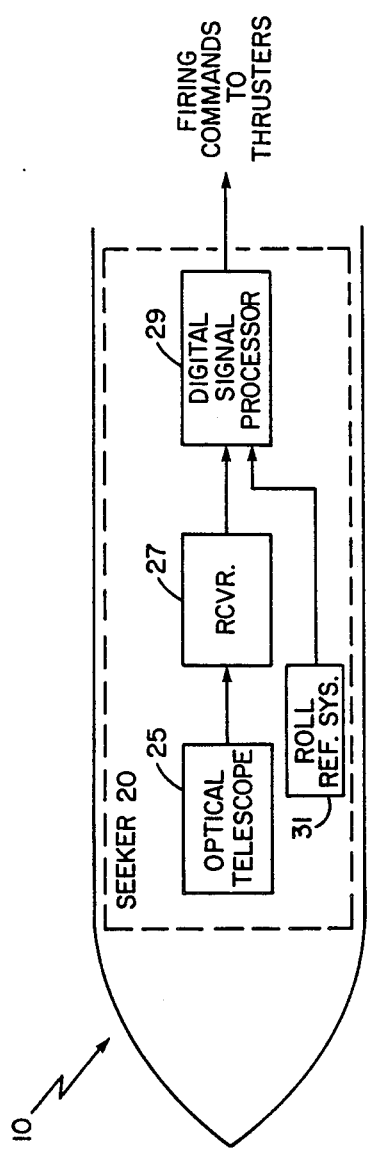
FIG. 1 is a block diagram showing the arrangement of the seeker, here contemplated to be used in a spin-stabilized projectile, such seeker incorporating an inertial roll reference system for establishing a nonrolling inertial reference plane.

Referring now to FIG. 1, a spin-stabilized projectile according to this invention is shown to include a seeker 20 having an optical telescope 25, a receiver 27, a digital signal processor 29 and an inertial roll reference system 31. The telescope 25, the receiver 27 and the digital signal processor 29 are identical to like-numbered elements in U.S. Pat. No. 4,347,996 and will, therefore, not be described in detail. Suffice it to say here that the telescope 25 is effective to detect laser illumination energy reflected from a target (not shown) onto a pair of silicon detectors (also not shown). Output signals from the latter are suitably amplified and processed in the receiver 27 prior to being digitized in an analog-to-digital converter (not shown) and applied to the digital signal processor 29. The latter also receives the digitized output signals from an inertial roll reference system 31, which will be described in detail hereinbelow. Suffice it to say here that the inertial roll reference system 31 comprises a small solid state longitudinal A.C. accelerometer mounted radially off the centerline of the projectile 10 and forward of the center of gravity. The digital signal processor 29 operates on the signals provided by the receiver 27 and the inertial roll reference system 31 to derive fire control signals for the projectile thrusters (not shown).

Figure 2:
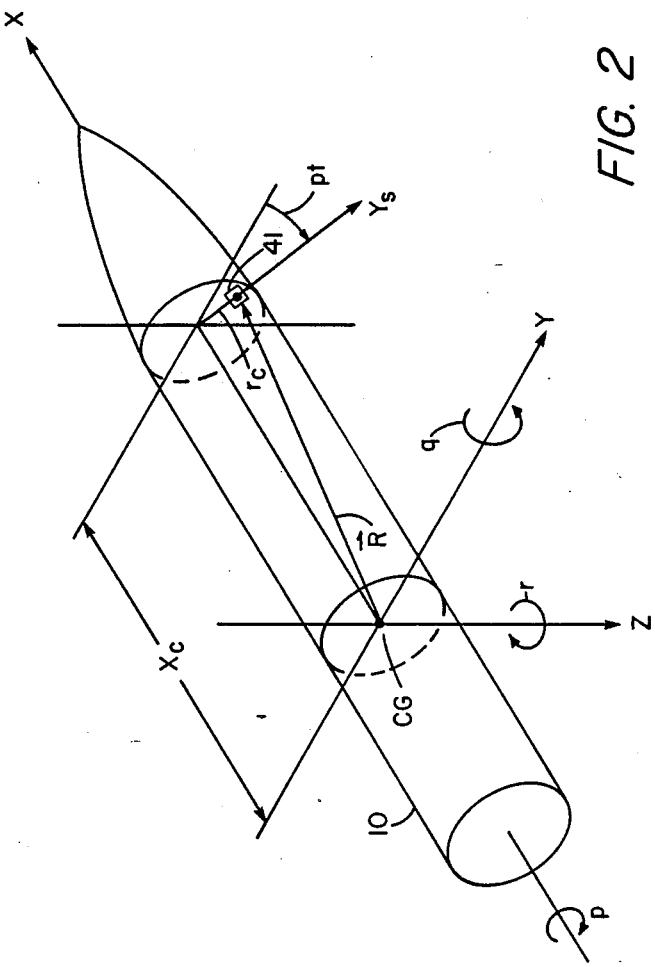
FIG. 2 is a sketch useful in understanding the operation of the contemplated inertial roll reference system.

Referring now to FIG. 2, the theory of operation of the inertial roll reference system 31 (FIG. 1) will be briefly explained. As mentioned hereinabove, the latter is comprised of a small longitudinal solid state A.C. accelerometer 41 (here a Model 8642A10 device from Kistler Instrument Company, 75 John Glenn Throughway, Amherst, N.Y. 14120) mounted radially off the centerline of the projectile 10 (FIG. 1) and forward of the center of gravity. The sensitive axis of the accelerometer 41 is parallel to the centerline or spin axis of the projectile 10 and the radial distance, $r_c$, between the centerline of the projectile 10 and the accelerometer 41 is as large as physically possible so as to maximize the acceleration cross-coupling terms due to projectile pitch, yaw and spin motion. The center of gravity, CG, of the projectile 10 is shown to be disposed at the origin of a nonspinning, X, Y, Z coordinate system. This coordinate system is used to determine the accelerations acting on the longitudinal accelerometer 41. A second body-fixed spinning coordinate system $X_S$, $Y_S$, $Z_S$ whose origin is at the longitudinal accelerometer is used to determine the accelerations sensed by the accelerometer 41. The X and $X_S$ axes are parallel, while the Y and $Y_S$ and Z and $Z_S$ axes are inclined to each other at the angle pt, which is the time integral of the projectile spin rate, p. The projectile inertial pitch and yaw rates are q and r, respectively. The accelerometer 41 is located at a distance, $X_c$, forward of the center of gravity of the projectile 10. The range vector, $\hat{R}$, and the angle, pt, locate the instantaneous position of the longitudinal accelerometer 41 in the nonspinning coordinates of the X, Y, Z reference system.

The output signal from the accelerometer 41 will be a measure of the longitudinal acceleration acting on it. For pure spinning motion of the projectile 10 this acceleration would be due solely to drag and would therefore be nearly constant. In the presence of precession and nutation, however, the accelerometer 41 will produce an additional signal which is sinusoidal at the spin frequency and sinusoidally modulated at the precession and nutation frequencies. The total acceleration sensed by the longitudinal accelerometer 41 can be shown to be:

$$Ax = (\dot{q} + 2xp)x_c \sin(pt) + (2qp - \dot{x}) \cos(pt) \quad \text{(Eq. 1)}$$

where DC terms have been neglected because the longitudinal accelerometer 41 does not respond to them and the q and r terms represent the time rate of change of the pitch and yaw rates, respectively. Estimates of both the spin and nutation rates of the projectile 10 are obtained by processing (in a manner to be described in detail hereinbelow) the accelerometer output signal. As mentioned briefly hereinabove, the spin rate must be known in order to establish the body-fixed, nonspinning reference frame and the nutation rate must be known in order to determine the firing times for the thrusters (not shown).

Figure 3:
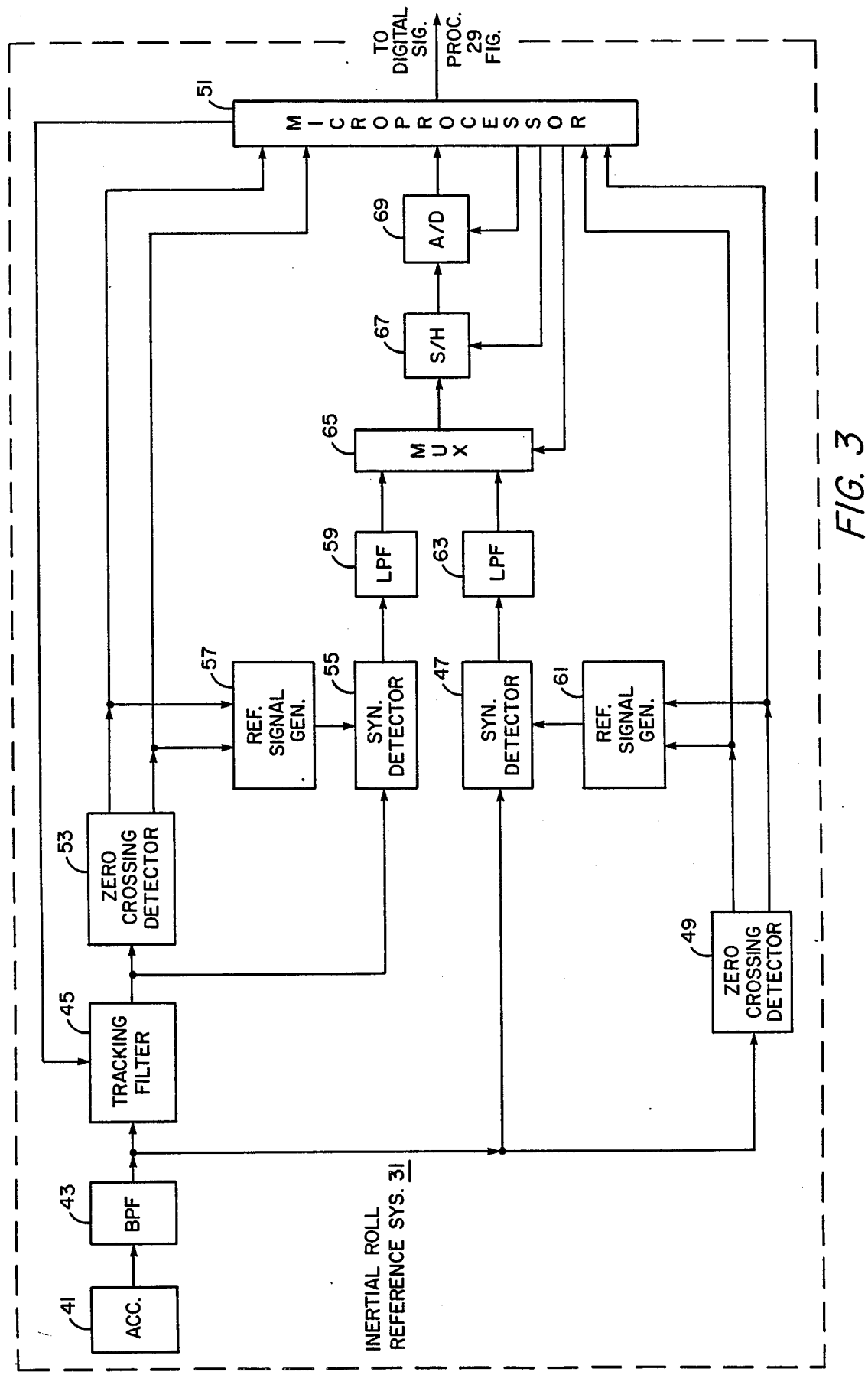
FIG. 3 is a simplified block diagram of the inertial roll reference system of FIG. 2.

Referring now to FIG. 3, the signal processing within the inertial roll reference system 31 will be described in detail. Thus, the output signal from the longitudinal solid state accelerometer 41 is passed to a bandpass filter 43. As mentioned hereinabove, the output signal from the accelerometer 41 comprises a component at the spin frequency of the projectile 10 (FIG. 2) that is modulated by both the precession and nutation frequencies. That is to say, if only the lower sideband frequencies are considered, the output signal from the longitudinal accelerometer 41 will have components at the spin, spin minus nutation and spin minus precession frequencies. The nutation frequency is higher than the precession frequency. The spin frequency is expected to vary from 80 to 280 Hz. Allowing for a maximum nutation frequency of 40 Hz, the bandwidth (flat frequency response) of the bandpass filter 43 is set from 40 Hz to 280 Hz. Consequently, all output signals from the longitudinal accelerometer 41 below 40 Hz and above 280 Hz are rejected by the bandpass filter 43. The output signal from the latter is split and provided as an input signal to a tracking filter 45, a synchronous detector 47 and a zero cross detector 49.

The tracking filter 45 is a very narrow bandpass (7 Hz bandwidth) device, the center frequency of which can be controlled by a microprocessor 51 between 40 and 280 Hz in discrete intervals within +0.5 Hz. With the center frequency of the tracking filter 45 centered at the estimated spin frequency, the spin minus nutation frequency component will be rejected. After launch the center frequency of the tracking filter 45 is adjusted by the microprocessor 51, the output of the zero crossing detector 49 and a stored algorithm which estimates spin from knowledge of launch zone, gun elevation and time of flight estimates loaded into the projectile 10 (FIG. 1) prior to launch.

The output signal from the tracking filter 45 is provided as an input signal to both a zero crossing detector 53 and a synchronous detector 55. The zero crossing detector 53 provides uncompensated estimates of the spin rate of the projectile 10 (FIG. 1) by measuring the time between zero crossings of the output signal from the tracking filter 45. To this end, the zero crossing detector comprises a pair of voltage comparators (not shown), one of which responds to the positive slope and the other to the negative slope of the input signal. The function of the voltage comparators (not shown) is to compare the instantaneous value of the input signal at a first input port with a reference voltage on a second input port and produce a logic level 1 or 0 at the output port when one input is higher than the other.

Referring briefly here now to FIGS. 4A to 4C, the input and output signals from the zero crossing detector 53 (FIG. 3) are illustrated. Thus, the input signal to the latter is shown in FIG. 4A to be a sinusoidal signal at the spin frequency. The output from the negative and positive slope comparators (neither of which is shown) are shown in FIGS. 4B and 4C, respectively. As mentioned briefly hereinbefore, the time between successive zero crossings (i.e., $t_0-t_1$, $t_1-t_2$, ...) will be a measure of half the spin period. If one of the comparators (not shown) within the zero crossing detector 53 (FIG. 3) has a large gain difference with respect to the other comparator (not shown), then the zero crossing time interval will be in error. Such an error is reduced during flight of the projectile 10 (FIG. 1) by compensating the measured zero crossing times by means of algorithms (to be described in detail hereinbelow) in the microprocessor 51 (FIG. 3). Thus, the negative and positive slope zero crossings of FIGS. 4B and 4C, respectively, are provided as input data to the microprocessor 51 (FIG. 3) wherein they are "time tagged" and stored for processing to produce a compensated estimate of the spin rate. In general, it may be shown that the uncompensated zero crossing rate estimate is equal to the true spin rate of the projectile 10 (FIG. 1) modified by an error corresponding to the precession frequency (when the gravity turn rate is small compared to the precession rate).

Referring back now to FIG. 3, the positive and negative slope zero crossings from the zero crossing detector 49 are also applied to the microprocessor 51. The zero crossing detector 49 is identical to zero crossing detector 53 with the exception that the input signal to the former is obtained from the output of the bandpass filter 43. However, because the bandwidth of the output signal from the bandpass filter 43 is greater than that of the output signal from the tracking filter 45, the spin frequency estimate obtained from the zero crossing detector 49 will not be as accurate as that obtained from the zero crossing detector 53. That is to say, the coarse spin estimate obtained from the zero crossing detector 49 has an error corresponding to both the precession and nutation frequencies. The coarse spin estimate from the zero crossing detector 49, together with an estimate developed within the microprocessor 51 from knowledge of the launch zone, gun elevation and time of flight, are used to set the center frequency of the tracking filter 45.

The output signals from the zero crossing detector 53 are also provided as input signals to a reference signal generator 57 (here a conventional edge triggered set-reset flip-flop) that is effective to develop the reference signal for the synchronous detector 55. The output signal from the reference signal generator 57 is set to a logic level 1 by the rising edge of the positive slope zero crossing input signal, and is reset to a logic level 0 by the rising edge of the negative slope zero crossing input signal. It follows, then, that the output signal from the reference signal generator will be a logic level 1 when the output signal from the tracking filter 45 is positive, and a logic level 0 when the output signal from the tracking filter 45 is negative. The output signal from the reference signal generator 57 is used to switch the gain of the synchronous detector 55 to +1 for a logic level 1 input and to −1 for a logic level 0 input. The output signal from the synchronous detector 55 may be defined as the product of the input signal (here the output of the tracking filter 45) and the gain of the synchronous detector 55. Consequently, the output signal from the latter is equal to the input signal when the reference signal is a logic level 1, and is equal to the negative of the input signal when the reference signal is a logic level 0.

It should now be appreciated by those of skill in the art that the gain of the synchronous detector 55 as a function of time is a square wave which may be mathematically expressed as an infinite sum of odd harmonic cosine signals with the fundamental frequency expressed in terms of the time between two consecutive zero crossings. The band-limited noise on the input signal to the synchronous detector 55 will be translated by the demodulating process and, therefore, the noise at the output of such detector will have a power spectral density equal to the input noise power spectral density within a 7 Hz bandwidth. The output signal from the synchronous detector 55 is then filtered in a low pass filter 59 in order to recover the envelope information.

It should now be appreciated that if the precession frequency of the projectile 10 (FIG. 2) is assumed to be 1.8 Hz and the band stop or cutoff frequency of the low pass filter 59 is 1.8 Hz (i.e., the transfer function of the low pass filter 59 has maximum gain between DC and 1.8 Hz), then the output signal from the low pass filter 59 will consist of a DC signal with a slowly varying AC component proportional to the precession frequency. The synchronous detector 55 and the low pass filter 59 are therefore effective to frequency translate the output signal from the tracking filter 45, which comprises a spin frequency carrier modulated by the precession frequency, to a DC signal and a low frequency sinusoid at the precession frequency.

The synchronous detector 47 is identical to the synchronous detector 55 and the reference signal generator 61 is also identical to the reference signal generator 57. However, the input signals for the synchronous detector 47 are obtained from the bandpass filter 43 and the reference signal generator 61. The output signal from the synchronous detector 47 is a product of those input signals and is used to estimate (in a manner to be described in detail hereinbelow) the nutation frequency of the projectile 10 (FIG. 2). The output signal from the synchronous detector 47 is filtered in a low pass filter 63 whose cutoff or band stop frequency is set at the expected maximum nutation frequency. The output signal from the low pass filter 63 therefore comprises a DC signal together with components of three AC signals superimposed together. The frequencies of these AC signals correspond to the nutation, precession and nutation minus precession frequencies.

The output signals from the low pass filters 59, 63 are time-multiplexed into a single channel in a multiplexer 65 in response to control signals provided by the microprocessor 51. The multiplexed data from the multiplexer are passed, via a sample and hold (S/H) 67 and an analog-to-digital converter (A/D) 69, to the microprocessor 51. It will be appreciated that the S/H 67 samples the output of the multiplexer 65 at a specified time and then holds that voltage level at its output until the A/D 69 performs its conversion process. The timing and control of the multiplexer 65, the S/H 67 and the A/D 69 is accomplished in a synchronous manner by the microprocessor 51. The sampling rate is sufficiently fast to ensure that in any two consecutive samples any variation in amplitude is attributable to random noise. Therefore, consecutive samples can be averaged to reduce the effects of noise and increase the signal strength. Finally, it should be noted that for each output signal from the multiplexer 65 a digital word is formed in the microprocessor 51 that is coded to represent the instantaneous amplitude of that signal and the corresponding sampling time.

Before proceeding with a detailed description of the contemplated signal processing technique within the microprocessor 51 that is intended to improve the accuracy of the spin and nutation frequency estimates derived from the zero crossing data, a brief review of the theory of operation of the inertial roll reference system 31 (FIG. 1) will be beneficial. In order to appreciate how the spin and nutation rates of the projectile 10 (FIG. 2) are computed from the measured zero crossing data, the output signal from the longitudinal accelerometer 41 (FIG. 2) must be viewed in a spinning reference frame whose origin is coincident with such accelerator. In such reference frame, illustrated in FIG. 5A, the gravity vector, $\vec{G}$, rotates in a counter-clockwise (CCW) direction about the origin, O, at the spin rate, p. The precession vector, $\vec{F}$, is attached to the tip of the gravity vector, $\vec{G}$, and rotates with the latter about the origin, O, at the spin rate, p. The precession vector, $\vec{F}$, also rotates, in a clockwise (CW) direction, about the tip of the gravity vector, $\vec{G}$, at the precession rate, $a_1$. The vector, $\vec{V}_{TF}$, represents the sum of the $\vec{G}$ and $\vec{F}$ vectors. Recalling that the tracking filter 45 is effective to remove the spin minus nutation sideband from the output signal of the longitudinal accelerometer 41, the projection of the $\vec{V}_{TF}$ vector onto the horizontal axis (not numbered) at any instant in time represents the instantaneous magnitude of the signal out of the tracking filter 45 (FIG. 3). The projection of the $\vec{V}_{TF}$ vector onto the horizontal axis is given by:

$$\vec{V}_{TF} = [(\vec{G}+\vec{F}\cos a_1 t)^2 + (\vec{F}\sin a_1 t)^2]^{\frac{1}{2}} \cos(pt - \phi) \quad \text{(Eq. 2)}$$

Figure 5C:
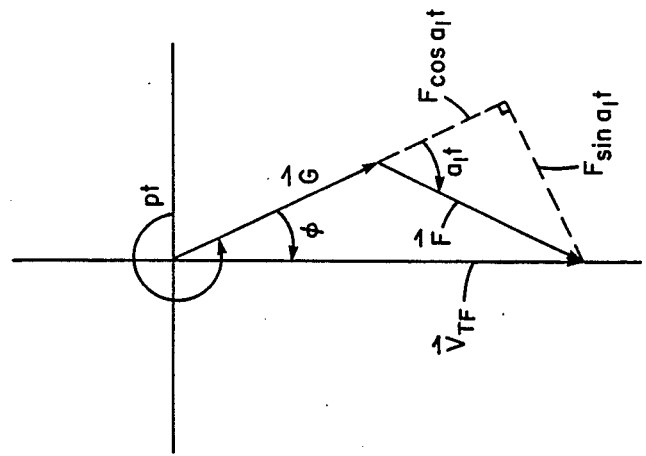
FIGS. 5A to 5C are sketches useful in understanding how corrected spin estimates are developed within the microprocessor of FIG. 3.

It should now be appreciated from the foregoing that the intersection of the $\vec{V}_{TF}$ vector with the vertical axis (not numbered) corresponds to the zero crossings of the output signal from the tracking filter 45. The negative slope zero crossing occurs when the $\vec{V}_{TF}$ vector crosses the vertical axis (not numbered) in the up direction, and, conversely, the positive slope zero crossings occur when the $\vec{V}_{TF}$ vector crosses the vertical axis when pointed down. The negative and positive slope zero crossings are illustrated in FIGS. 5B and 5C, respectively. From FIG. 5B and Equation (2) it can be shown that the negative slope zero crossings occur when:

$$pt - \phi = \frac{\pi}{2}, \frac{5\pi}{2}, \frac{9\pi}{2} \ldots (4N-3)\frac{\pi}{2}$$

when N=1, 2, 3, . . . . Likewise, from FIG. 5C the positive slope zero crossings occur when:

$$pt - \phi = \frac{3\pi}{2}, \frac{7\pi}{2}, \frac{11\pi}{2} \ldots (4N-1)\frac{\pi}{2}$$

where N=1, 2, 3, . . . . It follows, therefore, that the positive slope zero crossing time, $T_{ZCP}$, and the negative slope zero crossing time, $T_{ZCN}$, may be expressed as:

$$pT_{ZCP} - \phi T_{ZCP} = (4N - 1)\frac{\pi}{2} \quad \text{(Eq. 3)}$$

$$pT_{ZCN} - \phi T_{ZCN} = (4N - 3)\frac{\pi}{2} \quad \text{(Eq. 4)}$$

Equations (3) and (4) may be reduced to:

$$T_{ZCP} = \frac{(4N-1)\pi/2}{p} + \frac{\phi(T_{ZCP})}{p} \quad \text{(Eq. 5)}$$

$$T_{ZCN} = \frac{(4N-3)\pi/2}{p} + \frac{\phi(T_{ZCN})}{p} \quad \text{(Eq. 6)}$$

Subtracting Equations (5) and (6) for the time difference between successive zero crossings yields:

$$T_{ZCP} - T_{ZCN} = \frac{\pi}{p} + \left(\frac{\phi T_{ZCP} - \phi T_{ZCN}}{p}\right) \quad \text{(Eq. 7)}$$

Rearranging Equation (7) to solve the corrected spin rate p $T_{ZCP}$, valid at the positive slope zero crossings, yields:

$$pT_{ZCP} = \frac{\pi}{T_{ZCP} - T_{ZCN}} + \frac{\phi T_{ZCP} - \phi T_{ZCN}}{T_{ZCP} - T_{ZCN}} \quad \text{(Eq. 8)}$$

where the uncorrected fine zero crossing spin estimate (meaning those estimates derived from the output of the tracking 45 (FIG. 3) is defined as:

$$2\pi F_{ZC}(T_{ZCP})_{FINE} = \frac{\pi}{T_{ZCP} - T_{ZCN}} \text{ radians/sec.}$$

$$F_{ZC}(T_{ZCP})_{FINE} = \frac{1}{2(T_{ZCP} - T_{ZCN})} \text{ Hz}$$

The second term of Equation (8) is defined as the correction factor. It may be calculated by first defining (from FIGS. 5A to 5C):

$$\phi(t) = \tan^{-1}\left(\frac{F \sin a_1 t}{G + F \cos a_1 t}\right) \quad \text{(Eq. 9)}$$

Thus, $$\frac{\phi T_{ZCP} - \phi T_{CN}}{T_{ZCP} - T_{ZCN}} = \frac{\tan^{-1}\left(\frac{\left(\frac{F}{G}\right)\sin a_1 T_{ZCP}}{1 + \left(\frac{F}{G}\right)\cos a_1 T_{ZCP}}\right) - \tan^{-1}\left(\frac{\left(\frac{F}{G}\right)\sin a_1 T_{ZCN}}{1 + \left(\frac{F}{G}\right)\cos a_1 T_{ZCN}}\right)}{T_{ZCP} - T_{ZCN}} \quad \text{(Eq. 10)}$$

If $T_{ZCP} - T_{TZCN}$ approaches zero, then:

$$\lim \frac{\phi T_{ZCP} - \phi T_{ZCN}}{T_{ZCP} - T_{ZCN}} = \frac{d\phi}{dt} = \overset{\circ}{\phi} \quad \text{(Eq. 11)}$$

$$T_{ZCP} - T_{ZCN} \to 0$$

It follows, therefore, that $\phi(t)$ represents an approximate correction that must be applied to the uncorrected fine zero crossing spin estimates generated from two zero crossings times to produce a corrected spin estimate valid at a $T_{ZCP}$ time. Therefore, corrected spin estimates at all zero crossings within the time interval between TK1N and TK2N can be generated from the general expression for $\phi(t)$, which can be derived from FIG. 5A as follows:

$$\frac{F}{\sin\phi} = \frac{[(G + F\cos a_1 t)^2 + (F\sin a_1 t)^2]^{\frac{1}{2}}}{\sin(180 - a_1 t)} \quad \text{(Eq. 12)}$$

But, $\sin(180 - a_1 t) = \sin a_1 t$ and, therefore, Equation 12 reduces to:

$$\sin\phi = \frac{F\sin a_1 t}{[(G + F\cos a_1 t)^2 + (F\sin a_1 t)^2]^{\frac{1}{2}}} \quad \text{(Eq. 13)}$$

Taking the derivative of both sides of Eq. (13) yields:

$$100 \cos\phi = \quad \text{(Eq. 14)}$$

$$\frac{(F\sin a_1 t)(FGa_1 \sin a_1 t)}{(G^2 + F^2 + 2FG\cos a_1 t)^{3/2}} + \frac{Fa_1 \cos a_1 t}{(G^2 + F^2 + 2FG\cos a_1 t)^{\frac{1}{2}}}$$

Figure 5A:
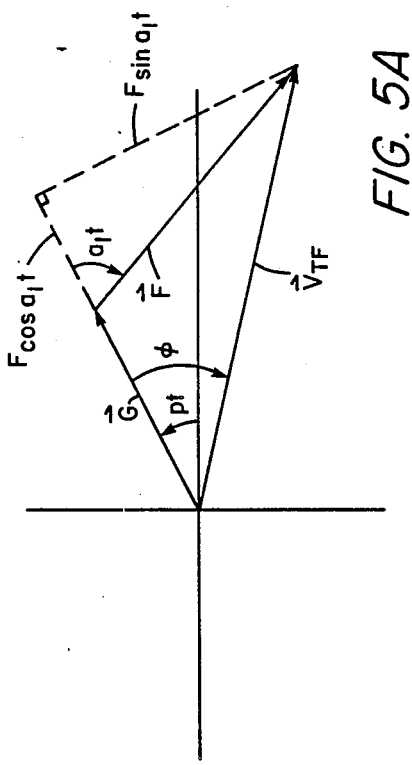
Figure 5B:
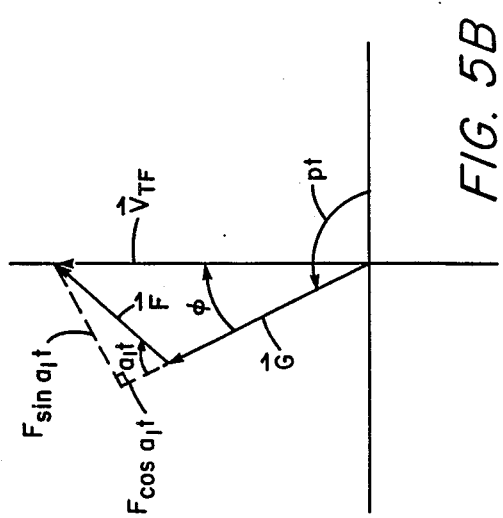

From FIG. 5A $$\cos\phi = \frac{G + F\cos a_1 t}{(G^2 + F^2 + 2FG\cos a_1 t)^{\frac{1}{2}}} \quad \text{(Eq. 15)}$$

Dividing Eq. (14) by Eq. (15) yields the following:

$$\overset{\circ}{\phi} = \frac{\left(\frac{F}{G}\right) a_1 \left(\frac{F}{G} + \cos a_1 t\right)}{1 + \left(\frac{F}{G}\right)^2 + 2\left(\frac{F}{G}\right) \cos a_1 t} \quad \text{(Eq. 16)}$$

This expression for $\overset{\circ}{\phi}$ is in units of radians per second.

Recalling that the maximum expected precession frequency is 1.8 Hz, the foregoing expression for $\overset{\circ}{\phi}$ is evaluated over one precession cycle for the maximum radial precession frequency (i.e., $a_1 = -11.3$ radians/sec.). A singularity zone is then defined as the locus of F/G and precession angles ($a_1 t$) that produce spin rate corrections ($\overset{\circ}{\phi}$) greater than the maximum radial precession frequency $a_1$.

The resulting singularity zone is defined as follows:

$0.5 \leq F/G \leq 1.1 \quad 150° < a_1 t < 210° \quad \overset{\circ}{\phi} > 11.3$ $1.1 \leq F/G \leq 2.2 \quad 120° < a_1 t < 240° \quad \overset{\circ}{\phi} > 11.3$ $2.5 \leq F/G \leq 6.0 \quad 105° < a_1 t < 255° \quad \overset{\circ}{\phi} > 11.3$ All zero crossing data that fall within this zone are not processed. All zero crossing data outside the singularity zone will be corrected to produce a time history of the projectile spin rate corresponding to each zero crossing time. Therefore, during each half period of precession corrected projectile spin rate estimates, $\hat{p}(t_{n+1})$, are generated from the zero crossing data outside the singularity zone by means of the following:

$$\hat{p}(t_{m+1}) = \frac{\pi}{t_{m+1} - t_n} + \hat{\phi}(t_{m+1}) \quad \text{(Eq. 17)}$$

where $$\overset{\circ}{\hat{\phi}}(t_{n+1}) = \frac{\left(\frac{\hat{F}}{\hat{G}}\right) a_1 \left(\frac{\hat{F}}{\hat{G}} + \cos(a_1 t_{n+1})\right)}{1 + \left(\frac{\hat{F}}{\hat{G}}\right)^2 + 2\left(\frac{\hat{F}}{\hat{G}}\right) \cos(at_{n+1})} \quad \text{(Eq. 18)}$$

and $t_{n+1} - t_n$ is the time difference between any two consecutive zero crossings outside the singularity zone. The estimates $\hat{F}$ and $\hat{G}$ will be defined in detail hereinbelow. It should be noted here that although the singularity zone effectively limits the number of corrected spin estimates available within any half period of precession, it can be shown that a minimum of 37 and a maximum of 127 corrected spin estimates for each half precession period are generated during the terminal flight phase of the projectile 10 (FIG. 1).

The compensated spin estimate is computed from the corrected spin estimates generated each half cycle of precession. However, the corrected spin estimates contain random errors associated with noise, variations in parameters and measurement inaccuracies. It can be shown that the error free spin rate of the projectile 10 (FIG. 2) may be expressed mathematically as a linear function of flight time as follows:

$$p(t) = A_0 + A_1 t \quad \text{(Eq. 19)}$$

Therefore, the corrected spin rate estimates can be used to estimate the $A_0$ and $A_1$ coefficients so that the compensated spin rate at a future time can be generated from this linear function of time. In the process of solving the foregoing mathematical expression for the true spin rate the N digital words which represent the corrected spin rate will be smoothed to produce the linear function. The smoothing of the N corrected spin rate estimates during each half period of precession to produce the compensated spin rate estimate is performed by means of at least squares filtering operation within the microprocessor 51 (FIG. 3).

The operation of a least squares filter is well known to those of skill in the art; however, for the sake of completeness that processing will be briefly described here. Thus, if we let $\hat{p}(t_n)$ represent the "N" corrected spin rate estimates during any half period of precession and we let Eq. (19) be a function of time that best represents the $\hat{p}(t_n)$ data, then the coefficients $A_0$ and $A_1$ can be determined by requiring the sum of the squares of errors between the data and the linear function to be minimized. Smoothing is accomplished by solving for values of $A_0$ and $A_1$ to fit the first K data points and from the resulting equation a smoothed value of P(t), corresponding to one of the measured data points is computed. The next unused measured data point will be added to the previous group of data points, the first data point of that group will be discarded, and another polynomial and smoothed value will be found. The last two steps are repeated until all data points have been used. The last polynomial generated represents the smoothed corrected spin estimates evaluated at the corresponding zero crossing times ($t_n$). The compensated spin estimate is generated from this last polynomial knowing $A_0$ and $A_1$ as follows:

$$\hat{p}(t_x) = A_0 + A_1(t_x) \quad \text{(Eq. 20)}$$

Figure 6:
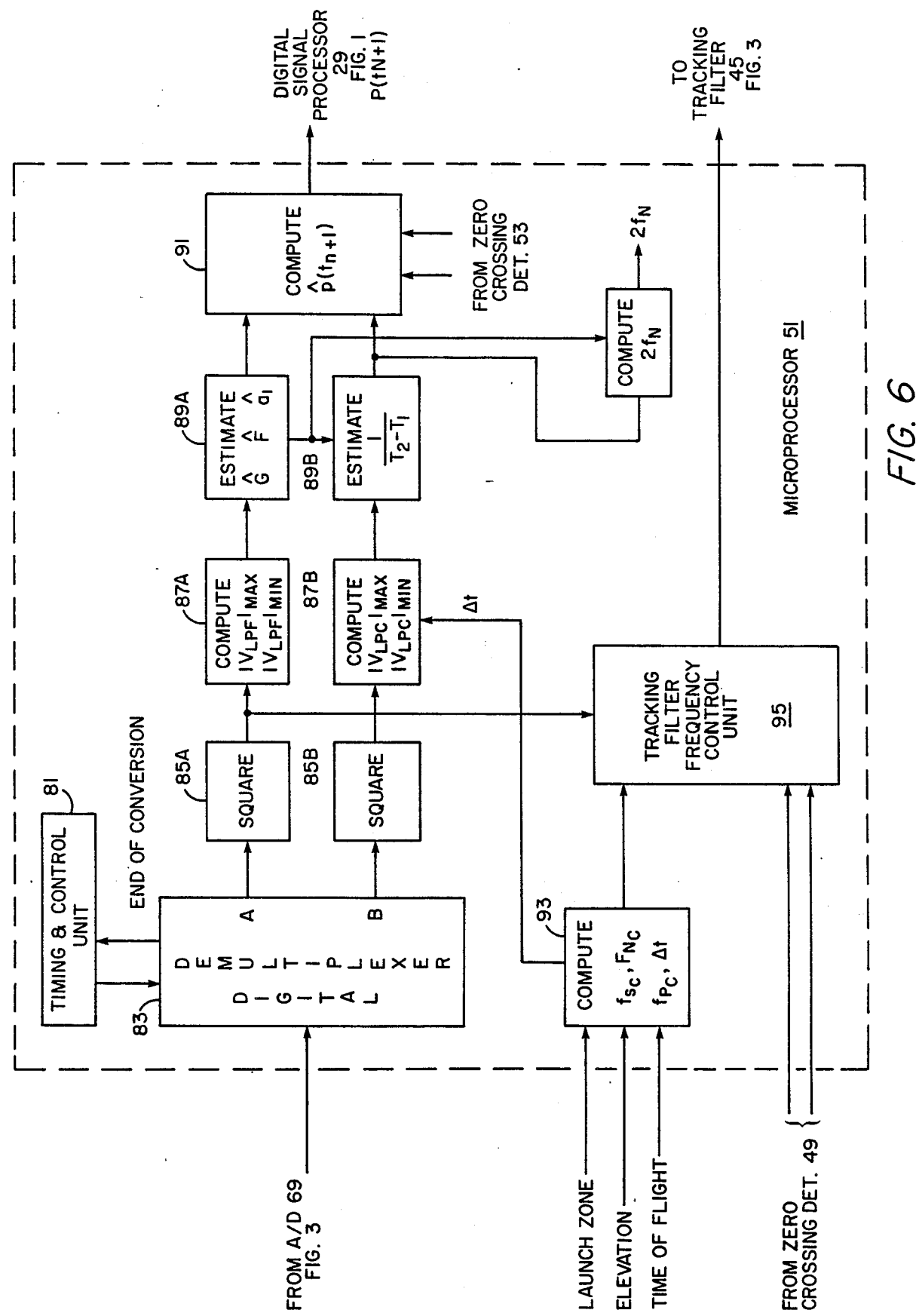
FIG. 6 is a functional block diagram of the microprocessor of FIG. 3.

Referring now to FIG. 6, the signal processing within the microprocessor 51 will be described in detail. Before proceeding, however, it should be noted that the timing and control unit 81 within the microprocessor 51 generates the switch control signal for the multiplexer 65 (FIG. 3), the sample and hold command for the S/H 67 (FIG. 3) and the start convert command for the A/D 69 (FIG. 3) so that the output signals from the low pass filters 59, 63 (FIG. 3) can be converted into digital words at uniform time intervals. The A/D converter 69 (FIG. 3) also sends an end of conversion signal to the microprocessor 51 which enables the latter to develop, via the timing and control unit 81, a data transfer signal for the A/D 69 thereby to ensure that only valid data samples are transferred to the microprocessor 51. The input data to the latter are passed to a digital demultiplexer 83 which, under the control of the timing and control unit 81, is effective to separate the two N-bit digital words that are time-multiplexed at the output of the A/D converter 69 and add a clock setting (reading) to each word. That clock setting represents the time in which the rising edge of all the zero crossings is detected. All zero crossings are therefore time tagged. The N bit digital words, including the time tags, corresponding to the output from the low pass filter 59 (FIG. 3), are provided on the A output port, while those corresponding to the output from the low pass filter 63 (FIG. 3) are provided on the B output port. It should be recalled that the output signal from the low pass filter 59 (FIG. 3) corresponds to the synchronously detected output signal from the tracking filter 45 (FIG. 3).

The instantaneous magnitude of the signal out of the tracking filter 45 (FIG. 3) is given by Eq. (2) and will be referred to hereinafter as $|V_{LPF}|$, where the subscript F denotes the fact that this signal is used to derive fine spin frequency estimates. As mentioned briefly hereinabove, the synchronous detection and low pass filtering of that output signal is effective to reduce the tracking filter output signal to a DC signal and a low frequency sinusoid at the precession frequency. Consequently, the magnitude of the output signal from the low pass filter 59 (FIG. 3) and therefore from the A output port of the demultiplexer 83 may be expressed as:

$$|V_{LPF}| = (G^2 + F^2 + 2GF \cos a_1 t)^{\frac{1}{2}} \quad \text{(Eq. 21)}$$

where $$G = Kg\left(\frac{g}{u}\cos\theta\right) p\lambda c$$

$$F = Kg(2C_1 a_1 e^{\phi_1 t}) p\lambda c$$

$$a_1 = 2\pi fp$$

and Kg is a constant representing the product of the bandpass filter 43 (FIG. 3) and the tracking filter 45 (FIG. 3) with an acelerometer scale factor;

$$\left(\frac{g}{u}\cos\theta\right)$$

is the gravity turn rate and for any processing cycle may be considered to be a constant; $C_1$ is the peak undamped precession angular displacement; and, $\phi_1$ is a precession damping exponent. The signal represented by Eq. (21) is processed within the microprocessor 51 to derive estimates of the precession rate (2 $C_1 a_1 e^{\phi_1 t}$) and gravity turn rate $$\frac{g \cos \theta}{u}$$

as well as an estimate of the precession frequency $a_1$. The signal processing involves squaring each data sample and identifying the maximum and minimum values and the corresponding times of occurrence. Thus, the output signals from port A of the demultiplexer 83 are applied to a multiplier 85A wherein those output signals are squared to provide an output signal that may be expressed as:

$$|(V_{LPF})^2| = G^2 + F^2 + 2GF \cos a_1 t \quad \text{(Eq. 22)}$$

The output signals from the multiplexer 85A are passed to a calculating element wherein the maximum and minimum values of Eq. (22) and their corresponding times of occurrence are computed. It can be shown that:

$$|(V_{LPF})^2|_{max} = G^2 + F^2 + 2GF = K_1 \quad \text{(Eq. 23)}$$

when $$t_{max} = \frac{2N\pi}{a_1} \quad \text{(Eq. 24)}$$

and $$|(V_{LPK})^2|_{min} = G^2 + F^2 - 2GF = K_2 \quad \text{(Eq. 25)}$$

when $$t_{min} = \frac{(2N + 1)\pi}{a_1} \quad \text{(Eq. 26)}$$

where $t_{max}$ and $t_{min}$ are the times when $|(V_{(LPF)})^2|$ is a maximum and a minimum, respectively, within any time interval $2/a_1$ long.

The $K_1$ and $K_2$ values from the calculating element 87 together with the corresponding times of occurrence are passed to an estimator 89A wherein estimates of the precession rate, $\hat{F}$, the gravity turn rate, $\hat{G}$, and the precession frequency, $\hat{a}_1$, are generated. Combining Eqs. (24) and (26), the precession rate, $a_1$, may be expressed as:

$$a_1 = \frac{\pi}{t_{min} - t_{max}} \quad \text{(Eq. 27)}$$

Similarly, by simultaneously solving Eqs. (23) and (25) and combining terms it may be shown that the following expressions for F and G obtain:

$$\hat{F} = \tfrac{1}{2}\sqrt{(K_1+K_2) + [(K_1+K_2)^2 - (K_1-K_2)^2]^{\frac{1}{2}}}$$

$$\hat{G} = \tfrac{1}{2}\sqrt{(K_1+K_2) - [(K_1+K_2)^2 - (K_1-K_2)^2]^{\frac{1}{2}}}$$

(Eq. 28)

The second output signal from the demultiplexer 83, provided at port B, corresponds to the output data from the low pass filter 63 and will be referred to hereinafter as the $V_{LPC}$ signal. Recalling that this output signal is derived from the bandpass filter 43 (FIG. 3) and contains the spin-nutation sideband frequency, estimates of twice the nutation frequency, $2f_n$, are generated by suitably processing this signal. It can be shown that the $V_{LPC}$ signal may be defined as:

$$V_{LPC}(t) = [(G_3^2 + P_3^2 + N_3^2) + G_3 P_3 \cos a_1 t + 2 G_3 N_3 \cos a_2 t + 2 P_3 N_3 \cos (a_2 - a_1)t]^{\frac{1}{2}} \quad \text{(Eq. 30)}$$

this signal is squared in a multiplier 85B to produce the following:

$$V_{LPC}^2(t) = G_3^2 + P_3^2 + N_3^2 + 2 G_3 P_3 \cos a_1 t + 2 G_3 N_3 \cos a_2 t + 2 P_3 N_3 \cos (a_2 - a_1)t \quad \text{(Eq. 31)}$$

where $$G_3 = K_{SF}\left(\frac{g}{u}\cos\theta\right) p\lambda c \quad \text{(Eq. 32)}$$

$$P_3 = K_{SF}(2C_1 a_1 e^{\phi_1 t}) p\lambda c \quad \text{(Eq. 33)}$$

$$N_3 = K_{SF}(2C_2 a_2 e^{\phi_2 t}) p\lambda c \quad \text{(Eq. 34)}$$

and $K_{SF}$ is a constant representing the product of an accelerometer scale factor and the gain of the bandpass filter 43 (FIG. 3), $C_2$ is the peak undamped nutation angular displacement, $\phi_2$ is a nutation damping exponent, and $a_2$ is the undamped nutation angular frequency. The contemplated processing technique involves identifying, over short time intervals ($\Delta t$), when the function given is Eq. (31) is a maximum and a minimum. The time interval, $\Delta t$, is defined as follows:

$$\Delta t = \frac{K}{F_{n(max)}} \quad \text{(Eq. 35)}$$

where K is a constant, $1 \le K \le 2$, and $F_{nmax}$ is the maximum expected nutation frequency estimated from initial conditions at launch. The processing over the time interval, $\Delta t$, is required because the shortest precession period is over ten times greater than the longest nutation period and, therefore, the change in precession angle over the longest nutation period will be a small fraction of a precession cycle. The time interval, $\Delta t$, is provided as a second input to the calculating element 87B. Within the latter the squared input signal from the multiplier 87A is processed to determine, within the interval $\Delta t$, the times of occurrence of a maximum and a minimum. Using the identity:

$$\cos (a_2 - a_1)t = \cos a_2 t \cos a_1 t + \sin a_2 t \sin a_1 t \quad \text{(Eq. 36)}$$

and letting $$A = 2G_3 N_3 + 2 P_3 N_3 \cos a_1 t \quad \text{(Eq. 37)}$$

$$B = 2 P_3 N_3 \sin a_1 t \quad \text{(Eq. 38)}$$

$$X = \tan^{-1}\left(\frac{B}{A}\right) \quad \text{(Eq. 39)}$$

which reduces to:

$$X = \tan^{-1}\left(\frac{\sin a_1 t}{\frac{G_3}{P_3} + \cos a_1 t}\right) \quad \text{(Eq. 40)}$$

it can be shown that Eq. (31) may be reduced to:

$$V_{LPC}^2(t) = G_3^2 + P_3^2 + N_3^2 + 2 P_3 N_3 \cos a_1 t + 2 N_3[G_3 + P_3] \cos (a_2 t + X) \quad \text{(Eq. 41)}$$

Eq. (41) will be a maximum when $$\cos (a_2 t + X_1) = 1 \quad \text{(Eq. 42)}$$

or $$a_1 t_1 + X_1 = 2N\pi \text{ where } N = 0,1,2 \ldots \quad \text{(Eq. 43)}$$

Conversely, Eq. (41) will be a minimum when:

$$\cos (a_2 t + X_1) = -1 \quad \text{(Eq. 44)}$$

or $$a_2 t + X_2 = (2N+1) \text{ where } N = 0,1,2 \ldots \quad \text{(Eq. 45)}$$

From the foregoing it should now be apparent that $t_1$ and $t_2$ are the times when $|V_{LPC}^2(t)|$ is a local maximum and a local minimum, respectively, within $\Delta t$ seconds. Simultaneously, solving Eqs. (43) and (45) yields the following:

$$a = \frac{\pi}{t_2 - t_1} - \frac{X_2 - X_1}{t_2 - t_1} \quad \text{(Eq. 46)}$$

or $$2\hat{f}_x = \frac{1}{t_2 - t_1} - \frac{1}{\pi}\left(\frac{X_2 - X_1}{t_2 - t_1}\right) \quad \text{(Eq. 47)}$$

where $$X_1 = \tan^{-1}\left(\frac{\sin a_1 t_1}{\frac{G_3}{P_3} + \cos a_1 t_1}\right) \quad \text{(Eq. 48)}$$

$$X_2 = \tan^{-1}\left(\frac{\sin a_1 t_2}{\frac{G_3}{P_3} + \cos a_1 t_2}\right) \quad \text{(Eq. 49)}$$

It follows from Eqs. (32) and (33) that:

$$\frac{G_3}{P_3} = \frac{\frac{g\cos\theta}{w}}{2C_1 a_1 t^{\phi_1 t}} = \frac{\hat{G}}{\hat{F}} \quad \text{(Eq. 50)}$$

From the foregoing it should now be apparent that estimates of twice the nutation frequency, $2f_n$, can be generated within an estimator 89B from the measured time difference between the occurrence of a maximum and a minimum in a short time interval, $\Delta t$, (obtained from the calculating element 87B) and from estimates of the precession frequency, $a_1$, gravity turn rate, G, and precession rate, F, obtained from the estimator 89A.

The output signals from the estimators 89A, 89B and the zero crossing times from the calculating element 87 are provided as input signals to a calculating element 91. The latter computes, during each half period of precession, corrected projectile spin rate estimates, $p(t_{n+1})$, from the zero crossing data falling outside the singularity zone (described hereinabove) in accordance with Eqs. (17), (18), and (20). The corrected spin estimates as well as estimates of the nutation frequency from the calculating element 91 are provided to the digital signal processor 29 (FIG. 1).

It should be recalled here that the microprocessor 51 also controls the positioning of the tracking filter 45 (FIG. 3) so that the latter is centered at the true spin frequency and includes the spin minus precession frequency sideband within its 7.0 Hz bandwidth. As mentioned briefly hereinbefore, prior to launch the initial conditions of launch zone, gun elevation and time of flight are loaded into the microprocessor. Those input signals are shown to be applied to a calculating element 93 that, after launch, is effective to compute the spin frequency, $f_{SC}$, the nutation frequency $f_{NC}$, and the precession frequency $f_{PC}$, as well as the short time period, $\Delta t$ (defined hereinabove), as a function of flight time. The $\Delta t$ signal is provided as an input to the calculating element 87B wherein it is utilized to establish a time window for estimating the nutation frequency half cycles, as explained hereinabove. The frequencies $f_{SC}$, $f_{NC}$ and $f_{PC}$ are computed from N order equations of the form:

$$f_{XC} = A_0 + A_1 t + A_2 t^2 \ldots A_N t^N \qquad \text{(Eq. 51)}$$

where $A_N$, N=0, 1, 2, ... are coefficients as a function of launch zone, muzzle velocity and gun elevation. The polynomials given by Eq. (51) are computed from look-up tables wherein simulations of ballistic flights in which the characteristics of these functions versus flight time, muzzle velocity and gun elevation are stored. The output signal from the calculating element 93 is provided as an input to a tracking filter frequency control unit 95. After launch, the latter generates a frequency command derived from the input data from the zero crossing detector 49 (FIG. 3) as follows:

$$\hat{f}_{zcc}(t_{N+1}) = \frac{1}{2(t_{N+1} - t_N)} \qquad \text{(Eq. 52)}$$

where $t_N$ is the zero crossing time and $t_{N+1}$ is the next zero crossing time. This establishes the initialization wherein $$f_C = \hat{f}_{ZCO} \; f_x = 0$$

If the amplitude of the nutation signal is larger than the worst case noise at the output of the tracking filter 45 (FIG. 3), then the magnitude of the output signal from the multiplier 85A, $|(V_{LPF})^2|$, will exceed a threshold within the tracking filter frequency control unit 95, thereby indicating the presence of a valid signal. However, the tracking filter 45 (FIG. 3) is initially misaligned from the calculated spin frequency, $f_{SC}$, and, therefore, a frequency error, $f_{ZC}-f_{SC}$ is developed. If this error is greater than 2.0 Hz, the search mode is initiated. In the search mode the tracking filter center frequency command consists of the difference between the coarse zero crossing frequency and f. That is, $f_C = f_{ZCC} - f_x$, where $f_X = F$. This center frequency command is compared to the resulting frequency obtained from the inputs from the fine zero crossing detector 53 (FIG. 3). When the center frequency command, $f_C$, is equal to the latter, the track mode is initiated and the center frequency command is set to $f_C = f_{ZCF} - f_x$, where $f_X = 0$. Thus, in the track mode, the center frequency command of the tracking filter 45 (FIG. 3) is controlled by the fine zero crossing frequencies derived from the output of the zero crossing detector 53 (FIG. 3).

Referring now to FIGS. 2, 3 and 5A to 5C, the manner in which the output signal from the accelerometer 41 may be processed to determine the up/down or left-/right inertial attitude of the spin-stabilized projectile 10 with respect to the earth will be explained. Thus, neglecting for the moment the effects of precession and nutation motion (i.e., F=N=0) it will be appreciated that the spin rate of the projectile 10 couples with the radial displacement, $r_c$, of the accelerometer 41 from the centerline of the projectile 10 to produce a tangential velocity component $V_T$ that may be expressed as:

$$\vec{V}_T = p X r_c \qquad \text{(Eq. 53)}$$

where p is the spin rate of the projectile 10. For the purposes of this discussion, the tangential velocity component when the accelerometer 41 is in the up or 12 o'clock position will be referred to as $\vec{V}_{T4}$; when the accelerometer 41 is at the right or 3 o'clock position, the tangential velocity component is referred to as $\vec{V}_{T1}$; when the accelerometer 41 is at the down or 6 o'clock position, the tangential velocity component is referred to as $\vec{V}_{T2}$; and when the accelerometer 41 is at the left or 9 o'clock position, the tangential velocity component is referred to as $\vec{V}_{T3}$. The turn rate of the projectile 10 due to gravity is directed to the left and induces an acceleration along the sensitive axis of the accelerometer 41, which is parallel to the X-axis of the projectile 10. When the accelerometer 41 is at the 3 and 9 o'clock positions the output signal from the latter is maximum negative and positive, respectively. When the accelerometer 41 is at the 6 o'clock or down position, the output signal from the latter crosses zero volts from the positive to the negative direction.

In the general case where the effects of spin, precession and nutation are considered, the filter 45 removes the nutation component and the resulting projectile motion may be modeled as shown in FIG. 5A. FIG. 5C then illustrates the negative-to-positive zero crossing, while FIG. 5B illustrates the positive-to-negative zero crossing. When the precession phase angle, $a_1 t$, is 0°, the negative-to-positive zero crossing time corresponds to the accelerometer 41 in the 6 o'clock or down position and the positive-to-negative zero crossing time corresponds to the accelerometer 41 in the 12 o'clock or up position. The maximum negative and positive signals will then correspond to the 3 o'clock and 9 o'clock positions of the accelerometer 41, respectively. When the precession phase angle, $a_1 t$, is 180°, the maximum negative and positive signals will then correspond to the 9 o'clock and 3 o'clock positions of the accelerometer 41, respectively, with the zero crossing times corresponding to the 12 o'clock and 6 o'clock positions. For all other conditions, up/down and left/right directions can be determined from the estimates of F, G and $a_1t$.

Having described a preferred embodiment of the invention, it will now be apparent to one of skill in the art that other embodiments incorporating its concept may be used. Thus, for example, while the accelerometer 41 is here mounted forward of the projectile center of gravity, it will be appreciated that it could just as well be mounted at or aft of the center of gravity. It is felt, therefore, that this invention should not be restricted to the disclosed embodiment, but rather should be limited only by the spirit and scope of the appended claims.

What is claimed is:

1. In a spinning projectile carrying a strap down seeker, a method for determining a roll reference, such method comprising the steps of:
   (a) determining the frequency spectrum of signals out of an accelerometer, such accelerometer having its sensitive axis parallel to, and displaced from, the centerline of the spinning projectile, said frequency spectrum having a first, a second and a third peak indicative, respectively, of the roll rate, the precession rate and the nutation rate of said spinning projectile;
   (b) filtering the frequency spectrum of signals to isolate the signals at the first peak; and
   (c) determining the points of zero crossing of the signals at the first peak.

2. In a spinning projectile carrying a seeker, apparatus for providing a roll reference signal, such apparatus comprising:
   (a) an accelerometer disposed within the spinning projectile at a distance from the centerline of said spinning projectile, to produce a composite signal having cosinusoidal components at a first frequency corresponding to the roll rate of the spinning projectile, a second frequency corresponding to the nutation rate and a third frequency at the precession rate;
   (b) filter means, responsive to the composite signal, for passing only the cosinusoidal component at the first frequency; and
   (c) conversion means, responsive to the cosinusoidal component at the first frequency out of the filter means, for producing the roll reference signal.

3. Apparatus as in claim 2 wherein the conversion means comprises a zero crossing detector.

* * * * *